United States Patent [19]

Killat et al.

[11] Patent Number: 4,732,946

[45] Date of Patent: Mar. 22, 1988

[54] PROCESS FOR THE PREPARATION OF CHELATION RESINS

[75] Inventors: George R. Killat; Edward R. Husser, both of Midland, Mich.

[73] Assignee: The Dow Chemical Company, Midland, Mich.

[21] Appl. No.: 559,542

[22] Filed: Dec. 8, 1983

[51] Int. Cl.$^4$ .................................................. C08F 8/32
[52] U.S. Cl. ................................ 525/379; 525/330.5; 525/380; 525/381
[58] Field of Search .................... 525/379, 381, 382

[56] References Cited

U.S. PATENT DOCUMENTS

| | | | |
|---|---|---|---|
| 3,899,472 | 8/1975 | Aya et al. | 521/32 |
| 3,931,126 | 1/1976 | Naylor | 525/382 |
| 4,343,920 | 8/1982 | Kahovec | 525/382 |
| 4,407,978 | 10/1983 | Kahovec et al. | 525/374 |

*Primary Examiner*—Joseph L. Schofer
*Assistant Examiner*—Bernard Lipman

[57] ABSTRACT

A process for the preparation of chelation resins is disclosed. By this process, chelation resins can be prepared without the formation of large amounts of waste salt streams. In addition, novel chelation resins are prepared according to this process.

7 Claims, No Drawings

PROCESS FOR THE PREPARATION OF CHELATION RESINS

BACKGROUND OF THE INVENTION

This invention relates to chelation resins and to a process for preparing chelation resins. In particular, this invention relates to novel aminopropionic acid chelation resins and processes for the preparation thereof.

A commercially employed process for preparing chelation resins involves reacting a crosslinked polymer containing pendant —$CH_2Cl$ moieties with hexamethylenetetraamine. The resulting adduct is then hydrolyzed to form a primary methylene amine group, i.e., —$CH_2NH_2$. This primary amine group is then further reacted with two equivalents of an ω-halocarboxylic acid to form the corresponding aminodicarboxylic acid moiety. Unfortunately, large amounts of waste materials are formed in the foregoing process. In the hydrolysis step, for example, six moles of formaldehyde and three moles of ammonium chloride are formed for each mole of primary amine which is formed. Such formaldehyde and ammonium chloride moieties either must be disposed of or reacted to regenerate hexamethylenetetraamine. However, even the regeneration of hexamethylenetetraamine from formaldehyde and ammonium chloride creates large amounts of salts which must be disposed of. The disposal of such undesirable side products is both an environmental and economic disadvantage of the foregoing process.

Accordingly, it would be desirable to provide a process for preparing chelation resins, which process provides for the attachment of chelating groups to a polymer backbone in good yield and without the formation of large quantities of undesired by-products.

SUMMARY OF THE INVENTION

Accordingly, the present invention is such a desirable process. The present invention is a process for preparing a chelation resin comprising
 (a) attaching
  (1) a Michaels addition adduct of ammonia, a primary amine, an alkylene diamine or a polyalkylene polyamine and at least one mole of an alkyl or inertly substituted alkyl ester of an α,β-ethylenically unsaturated carboxylic acid to
  (2) a water-insoluble organic polymer, then
 (b) converting at least one of the ester groups on said Michaels adduct to an acid group.

The process of this invention proceeds in good yield to form a chelation resin with good capacity for polyvalent cations. In addition, the only by-product formed in the practice of the process of this invention is an aliphatic alcohol which may be reclaimed and reused as desired. An additional advantage of this process is that the formation of the Michaels adduct employed herein is also performed without the formation of undesirable by-products. Yet another advantage of the process of this invention is that it provides for the preparation of certain novel chelation resins which have not heretofore been prepared.

In another aspect, the present invention is a chelation resin comprising a water-insoluble organic polymer containing a plurality of pendant chelating moieties as represented by general structures:

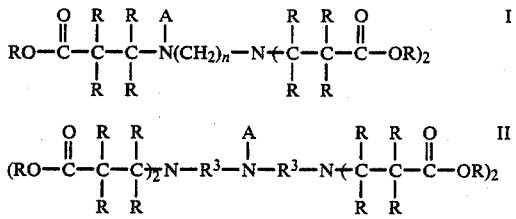

wherein A represents the polymer backbone, each R is independently hydrogen, lower alkyl, or inertly substituted lower alkyl, n is a positive integer from about 1 to about 6 and each R3 is independently an inertly substituted alkylene diradical. Such chelation resins are useful for the removal of diverse cations, particularly divalent metal ions, from aqueous solutions.

DETAILED DESCRIPTION OF THE INVENTION

The polymer employed in this invention is a water-insoluble organic polymer to which the Michaels addition adduct can be attached. In general, such polymer contains a plurality of reactive groups which react with the Michaels addition adduct to attach the adduct thereto. Preferably, the polymer contains a plurality of —$CH_2X$ groups, wherein X is halogen, more preferably chlorine or bromine. Polymers containing such —$CH_2X$ moieties include, for example, polymers of chloromethylstyrene and 3-halo-1-propene, as well as polymers of monomers which can be chloromethylated subsequent to polymerization, e.g., the diverse vinyl aromatics such as styrene, vinylmethylbenzene, alkyl-substituted styrenes; halo-substituted styrenes such as bromo- or chlorostyrene; polyvinylidene aromatics such as divinylbenzene, divinyltoluene, divinylxylene, trivinylbenzene and the like; halo-olefins, particularly vinyl halides such as vinyl chloride; esters of α,β-ethylenically unsaturated carboxylic acids, particularly acrylic or methacrylic acid, such as methyl methacrylate and ethyl acrylate; vinyl acetate and mixtures of one or more of said monomers. Of such monomers, the monovinylidene aromatics, particularly styrene or mixtures of styrene with a monoalkyl substituted styrene, the polyvinylidene aromatics, particularly divinylbenzene; esters of an α,β-ethylenically unsaturated carboxylic acid, particularly methyl methacrylate or combinations thereof are preferred. Particularly preferred are mixtures of styrene and divinylbenzene (DVB) or styrene, divinylbenzene and methyl methacrylate.

Most preferably, the polymer employed in this invention is one such as is commonly employed in commercial ion exchange resins. Such polymers are most typically copolymers of styrene and DVB. Such styrene/DVB copolymers may be of the so-called microporous (or gel) type or may be a so-called macroporous copolymer. Said gel type styrene/DVB copolymers generally comprise about 99.8 to about 92 percent styrene and about 0.2 to about 8 percent DVB. Relatively lightly crosslinked copolymers are generally more advantageously employed herein, e.g., copolymers containing from about 0.2 to about 5, more preferably from about 0.5 to about 3, weight percent DVB. More preferred are the so-called macroporous copolymers, which copolymers are generally prepared by the copolymerization of from about 80 to about 97 percent styrene with about 20 to about 3 percent DVB in the presence of a porogenic material such as isooctane which is soluble in the monomers but insoluble in the polymers. During the course of the polymerization of such macroporous copolymer, the newly formed polymer becomes insoluble in the porogenic material, thereby forming void spaces within the polymer structure. Of such macroporous resins, preferred are those which are crosslinked with from about 5 to about 20, more preferably 5 to 12, weight percent DVB and in which the porogenic material comprises from about 20 to about 55 percent of the combined weight of the monomers and porogenic material. Processes for preparing suitable microporous or gel polymers are taught, for example, Helfferich, *Ion Exchange,* McGraw-Hill Book Company, New York (1962). Processes for preparing the so-called macroporous copolymers useful in the present invention are taught in, for example, U.S. Pat. Nos. 3,549,562 and 3,637,535.

The foregoing polymers which do not contain groups through which the Michaels addition adduct can be attached are advantageously haloalkylated prior to attaching chelation groups according to this invention. Methods of haloalkylating the polymers and the haloalkylating agents employed in such methods are well known in the art and reference is made to U.S. Pat. Nos. 2,642,417; 2,960,480; 2,597,492; 2,597,493; 3,311,602 and 2,616,877 (all of which are hereby incorporated by reference) for purposes of illustration.

The chelating group which is attached to the polymer is the Michaels addition product of ammonia, a primary amine, an alkylene diamine, or a polyalkylene polyamine with an alkyl or inertly substituted alkyl ester of an $\alpha,\beta$-ethylenically unsaturated carboxylic acid. Preferably, the adduct is one of ammonia, an alkylene diamine, particularly a $C_1$-$C_4$ alkylene diamine, or a dialkylene triamine, particularly a —$C_1$-$C_4$ or alkylene triamine. Preferably, the ester is a $C_1$ to $C_6$ alkyl ester of acrylic or methacrylic acid, more preferably a methyl or ethyl ester of acrylic or methacrylic acid. Such Michaels addition products contain one or more propionic acid ester groups attached to a nitrogen atom of the ammonia or amine, i.e., one or more

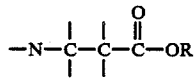    III moieties wherein R is an alkyl or inertly substituted alkyl group.

Said Michaels addition adducts are readily prepared by mixing the amine and ester together in the desired molar ratios (a small excess of ester may be employed, if desired) at ambient temperatures or with mild heating (i.e., 30°-60° C.) for about one to ten hours. This reaction is advantageously conducted neat when liquid amines are employed, although a suitable solvent may be employed, if desired. The reaction with ammonia is more advantageously carried out employing a solution of ammonia in a suitable solvent such as methanol.

The Michaels addition adduct of ammonia suitably employed herein may be the mono-, di- or tri-adduct thereof, i.e.,

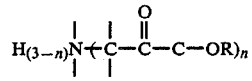    IV wherein R is as defined hereinbefore, and n is 1, 2 or 3. In general, a chelating group is more effective if at least two carboxylic acid groups are present thereon, so n is preferably 2 or 3. It is noted that the tri-adduct loses one of its propionic ester groups upon attachment to the polymer backbone. Accordingly, the use of either the di- or tri-adduct will result in the addition of the same chelating group to the polymer. However, the tri-adduct is preferred due to the ease of obtaining a high purity adduct when a tri-adduct is prepared.

The Michaels addition adduct of an alkylene diamine may also be the mono-, di- or tri- or tetra-adduct, with the tri-adduct being preferred. Preferably, the alkylene diamine is a $C_1$-$C_6$ alkylene diamine. More preferred alkylene diamine adducts are those of ethylene diamine. Most preferably, the Michaels addition adduct of the alkylene diamine is the tri-adduct of methyl acrylate or methyl methacrylate with ethylene diamine, i.e.,

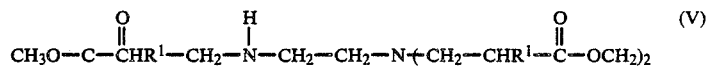    (V)

wherein $R^1$ is hydrogen or methyl. Said tri-adduct will typically attach to the polymer through the secondary nitrogen atom providing, after hydrolysis of all ester groups, a chelating group having three carboxylic acid moieties.

The Michaels addition adducts of a dialkylene triamine with $\alpha,\beta$-ethylenically unsaturated carboxylic acid esters employed herein include adducts of dialkylene triamines as represented by the structure:

$NH_2$—$R^3$—NH—$R^3$—$NH_2$    VI wherein each $R^3$ is independently an alkylene diradical. Preferably, each $R^3$ is a $C_1$-$C_6$ alkylene diradical. More preferably, each $R^3$ is the same alkylene diradical and is a methylene or ethylene diradical. Mono-, di-, tri- or tetra-adducts of the dialkylene triamine may be employed herein with di-, tri- and tetra-adducts being preferred. Generally, the addition of the ester group will take place at a primary nitrogen of dialkylene triamines. The subsequent attachment of the Michaels addition adduct to the polymer will typically be through a primary or secondary nitrogen atom on the adduct. For example, the tetra-adduct will most typically attach to the polymer through the central nitrogen atom forming a moiety represented by the structure:

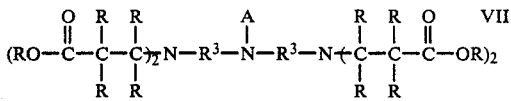    VII wherein R, and $R^3$ are as described hereinbefore and A represents a linkage to the polymer backbone.

The process of the present invention comprises (a) attaching the aforementioned Michaels adduct to the water-insoluble polymer and subsequently (b) converting at least one ester group on said Michaels adduct to a carboxylic acid group.

Attachment of the Michaels adduct to the polymer is generally effected by contacting the adduct with the polymer in a mole ratio of about 1.1 to about 6, preferably about 1.5 to 4 moles of adduct per mole of the group on the polymer which reacts with the Michaels adduct to attach the adduct thereto. The reaction may be conducted neat, i.e., without a solvent, or, if desired, using a solvent which is a good swelling agent for the polymer and which is inert to and is a good solvent for the Michaels adduct employed. Exemplary, such solvents include methylal, methylal-water mixtures and methanol. If desired, an excess of the Michaels adduct may be employed as the solvent. The temperature at which the reaction is conducted is determined by the desired rate of the reaction and the stability of the Michaels adduct. In general, the reaction may be conducted at temperatures in the range from about 0° C. to about 80° C. The reaction proceeds very slowly below 0° C. and accordingly, such low temperatures are not preferred. Above about 80° C., significant degradation of the Michaels adduct could occur. Preferably, the reaction is carried out at temperatures in the range from 40°-70° C. for a period of about two to seven hours.

Following the attachment of the Michaels adduct to the polymer, one or more of the ester groups is converted to carboxylic acid groups. Such conversion is readily effected by hydrolysis of the ester group with an aqueous base such as an aqueous solution containing 2-20 weight percent sodium hydroxide. It is noted that for certain adducts, the chemical environment of the various ester groups may be different and as a result, hydrolysis of certain ester groups may be more readily effected than the others. For example, the adduct prepared from three moles of methyl acrylate and one mole of ethylene diamine will form, when attached to the polymer backbone, a chelating group having one N-(methylpropionate) group and two N'-(methylpropionate) groups. It is believed that the N'-(methylpropionate) groups are readily hydrolyzed using a 1M aqueous sodium hydroxide solution while the N-(methylpropionate) group requires more stringent conditions, i.e., use of a 20 weight percent sodium hydroxide solution. In such cases, the more difficultly hydrolyzed ester group may be, if desired, retained as the ester. In general, however, it is contemplated that all of the ester groups will be hydrolyzed to form the corresponding acid groups.

As is apparent from the foregoing, the present process is useful for the preparation of diverse novel chelating resins. Of particular interest are those chelating resins attaching to the polymer a Michaels tri-adduct of alkylene diamines and alkyl or inertly substituted alkyl esters of $\alpha,\beta$-ethylenically unsaturated carboxylic acids, especially tri-adducts of methyl acrylate or methacrylate and ethylene diamine; and mono-, di-, tri- and tetra-adducts of dialkylene triamines with alkyl or inertly substituted alkyl esters of $\alpha,\beta$-ethylenically unsaturated carboxylic acids, especially tri- and tetra-adducts of methyl acrylate or methacrylate and diethylene triamine.

The chelating resins prepared by the process of this invention are useful in the extraction of ions from aqueous solutions, in particular, the extraction of metal ions from aqueous solutions. Chelating resins prepared according to the process of this invention may be employed for the removal of metal ions such as nickel, cobalt, copper, manganese and the like from aqueous solutions. The manner of use of these chelating resins is similar to the manner of use of conventional chelating agents. Absorption of the metal ions is effected by contacting an aqueous stream containing said ions with the chelating resins of this invention, particularly using an aqueous stream having a pH in the range from about 4 to about 10. Elution of the loaded resin is effected by washing the resin with an excess of a moderately strong solution of an inorganic acid, i.e., a 1N hydrochloric acid solution.

The following examples are provided to illustrate the invention and not intended to limit the scope thereof. All parts and percentages are by weight unless otherwise specified.

EXAMPLE 1

A. Preparation of Macroporous Styrene/DVB Copolymer

Into a 2 gallon, jacketed, agitated pressure reactor are added 2849 grams of deionized water, 12.3 grams of a 44 weight percent carboxymethylmethylcellulose solution, and 3.1 grams sodium dichromate. The agitator speed is adjusted to 250 rpm. To the agitated aqueous phase are added 1321 grams of styrene, 160 grams of technical grade DVB, 1017 grams of isooctane, 4.7 grams of a 50 weight percent t-butylperoctoate solution, and 3.1 grams of t-butylbenzoate. The mixture is heated to 80° C. with stirring for 8 hours and finished off at 110° C. for an additional 4 hours. The resulting copolymer beads are washed with deionized water and steam stripped to remove isooctane. After air drying, the copolymer is screened, retaining particles in the size range from about 250 and 425 microns in diameter.

A 150-gram portion of the screened copolymer is placed into a 2-liter, gas-jacketed reactor along with 650 ml of chloromethylmethyl ether. The ether and the copolymer are permitted to stand together for 30 minutes, and then 30 grams of ferric chloride are added. The reactor is heated to 50° C. and held at that temperature for 2.5 hours. The thus chloromethylated copolymer is then washed thoroughly with methanol to remove excess chloromethylmethyl ether.

B. Preparation of Tri-Adduct of Methyl Acrylate and Ethylene Diamine

A 40-gram portion of ethylene diamine is placed into a 500 ml flask. To this are added 170 grams of methyl acrylate over a 2-hour period. During the methyl acrylate addition, the flask is cooled in an ice bath to control the exotherm below 25° C. Upon completion of the acrylate feed, proton nuclear magnetic resonance analysis shows the reaction is approximately 67 percent complete. At this point, the temperature is raised to 40° C. for a period of 6 hours. At the end of this period, the reaction is 98 percent complete. The product adduct is analyzed and found to consist of approximately 75 percent of the tri-adduct with the remainder being tetra- and di-adduct.

C. Preparation of Chelation Resin

EXAMPLE 1

A 150-gram portion of the chloromethylated copolymer, prepared as described hereinbefore, is placed into a 1,000-milliliter (ml) flask fitted with a condenser and stirrer. Appoximately 700 grams of the tri-adduct mixture prepared as described in this Example is added. The mixture is heated to 60° C. for 6.5 hours. The resin is removed by filtration, rinsed with H$_2$O and then measured for weak base ion capacity to determine the degree of amination. The resin is found to have a weak base capacity of 0.87 meq/ml. This resin is placed in 15 percent sodium hydroxide at 60° C. for 2 hours in order to hydrolyze the ester groups to acid groups. Infrared analysis shows complete conversion of the ester groups.

EXAMPLE 2

A chelation resin is prepared according to the general procedure described in Example 1, except the reaction of the tri-adduct and resin is conducted at 70° C. for 7 hours. The weak base capacity of the chelation resin is found to be 1.06 meq/ml.

EXAMPLE 3

A chloromethylated styrene/DVB copolymer prepared as in Example 1, a tri-adduct of methyl acrylate and ammonia is prepared by dissolving 1 mole of ammonia in 100 grams of methanol, and adding this resulting solution over a 4-hour period to 3.3 moles of methyl acrylate. The reaction is exothermic, and methanol and excess methyl acrylate are distilled off the product. The tri-adduct is obtained in approximately 98 percent purity.

The resulting adduct is attached to the chloromethylated copolymer by combining 42.3 grams of the adduct to 14.7 grams of the copolymer in a 3-necked flask heating in a steam bath for 16 hours. Methanol and methyl acrylate are produced in the reaction of the adduct with the copolymer. Determination of the weak base and strong base ion exchange capacities of the resulting chelation resins reveals that essentially all the nitrogen atoms on the copolymer are tertiary atoms. The weak base capacity of the resulting chelation resin is 0.6 meq/g. This resin is found to load 28.8 mg of copper II ions per milliliter of wet resin.

EXAMPLE 4

The chelation resins of Examples 1 and 2 (designated Sample Nos. 1 and 2, respectively) are evaluated for capacity, selectively and kinetics in removing calcuim and magnesium ion from aqueous soutions.

An aqueous stream containing 2 percent total Salts, 100 ppm calcium ion and 100 ppm magnesium ion is prepared. Approximately 20 ml of the wet resin being tested is placed into a column. An aqueous salt stream is run through the column of 12 ml/minute. The leakage and breakthrough of the calcium and magnesium ions are monitored by coupled plasma techniques, with the results as shown in the following Table. For comparision, a conventional iminodiacetate chelation resin is evaluated in like manner, with the result as indicated as Sample No. C-1 in the following Table.

TABLE

| Resin Sample No. | Time Capacity (meq/ml) | | Leakage (ppb) | |
|---|---|---|---|---|
| | Ca # | Mg # | Ca # | Mg # |
| 1 | 3.74 | 2.83 | 200[1] | 100[2] |
| 2 | 3.93 | 3.05 | 150[3] | 100[4] |
| C-1* | 1.57 | 1.27 | 200[1] | 50[5] |

*Not an example of this invention.
[1] An initial leakage of 300 ppb as seen.
[2] An initial leakage of 200 ppb as seen.
[3] An initial leakage of 1,500 ppb as seen.
[4] An initial leakage of 1,150 ppb as seen.
[5] An initial leakage of 150 ppb as seen.

As can be seen from the foregoing Table, the chelation resin of this invention exhibits significantly increased capacities for both calcium and magnesium as compared to conventional iminodiacetate resins. Furthermore, the increased capacity is achieved with comparable exchange kinetics, as shown by the similar amounts of leaking exhibited by all the resins tested.

What is claimed is:

1. A process for preparing a chelation resin comprising a water-insoluble polymer having attached thereto a plurality of chelation groups, said process comprising
   (a) attaching
      (1) a Michaels addition adduct of ammonia, a primary amine, an alkylene diamine or a polyalkylene polyamine and at least one mole of an alkyl or inertly substituted alkyl ester of an $\alpha,\beta$-ethylenically unsaturated carboxylic acid per mole of amine hydrogen to
      (2) a water-insoluble organic polymer having a plurality of reactive groups which react with a nitrogen atom of the Michaels addition adduct to attach the adduct thereto through said nitrogen atom, then
   (b) converting at least one of the ester groups on said Michaels adduct to an acid group.

2. The process of claim 1 wherein the $\alpha,\beta$-ethylenically unsaturated carboxylic acid is a $C_1$ to $C_4$ alkyl ester of acrylic or methacrylic acid.

3. The process of claim 1 wherein the Michaels adduct is a tri-adduct of ammonia and methyl acrylate or methacrylate.

4. The process of claim 2 wherein the Michaels adduct is a tetra-adduct of methyl acrylate or methyl methacrylate and a $C_1$ to $C_4$ alkylene diamine.

5. The process of claim 4 wherein the alkylene diamine is ethylene diamine.

6. The process of claim 1 wherein the ester groups are subsequently converted to carboxylic acid groups by hydrolysis with an aqueous base.

7. The process of claim 6 wherein the Michaels adduct is a tetra-adduct of ethylene diamine and methyl acrylate or methacrylate and only two of the ester groups of said Michaels adduct are converted to carboxylic acid groups.

* * * * *